United States Patent [19]

Graentzel

[11] 4,002,918
[45] Jan. 11, 1977

[54] APPARATUS FOR THE IRRADIATION OF FLUIDS

[76] Inventor: Alfred Graentzel, Durmersheimer Str. 98, 75 Karlsruhe 21, Germany

[22] Filed: Apr. 8, 1976

[21] Appl. No.: 675,142

[30] Foreign Application Priority Data

Apr. 10, 1975 Germany .......................... 2515604

[52] U.S. Cl. .............................................. 250/431
[51] Int. Cl.² ...................................... G01M 21/24
[58] Field of Search ................... 250/431, 432, 438; 51/332, 374; 21/DIG. 2

[56] References Cited

UNITED STATES PATENTS

| | | | |
|---|---|---|---|
| 2,963,833 | 12/1960 | MacIntosh et al. .................... | 51/374 |
| 3,462,597 | 8/1969 | Young .............................. | 250/431 |
| 3,904,363 | 9/1975 | Free .................................. | 250/431 |

*Primary Examiner*—Alfred E. Smith
*Assistant Examiner*—Bruce C. Anderson
*Attorney, Agent, or Firm*—Klaus J. Bach

[57] ABSTRACT

Apparatus for the irradiation of fluids in which the fluid is conducted along the walls of a container having walls which are permeable for the radiation to which the fluid is exposed. Radiation sources are arranged around the container and a rotor is disposed within the container. The rotor consists of a body having axial bores and pins movably disposed in the bores and adapted to engage with their front ends the container walls thereby to wipe any deposits from the container walls during rotation of the rotor.

7 Claims, 4 Drawing Figures

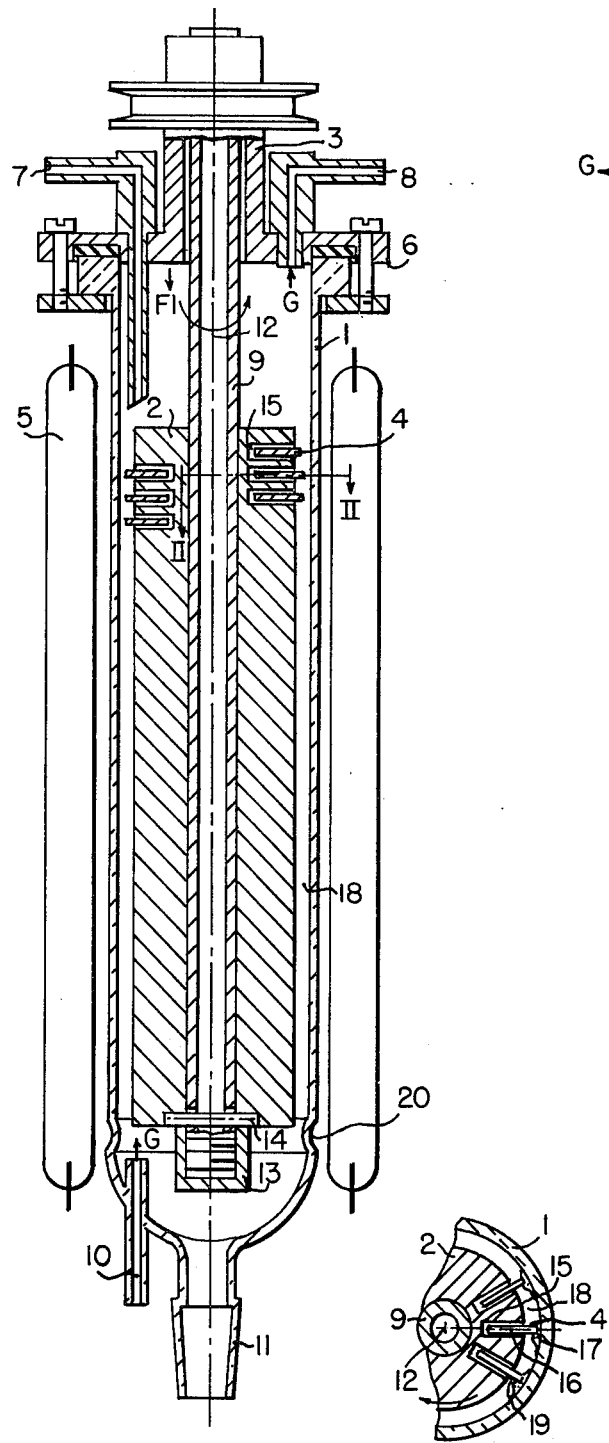
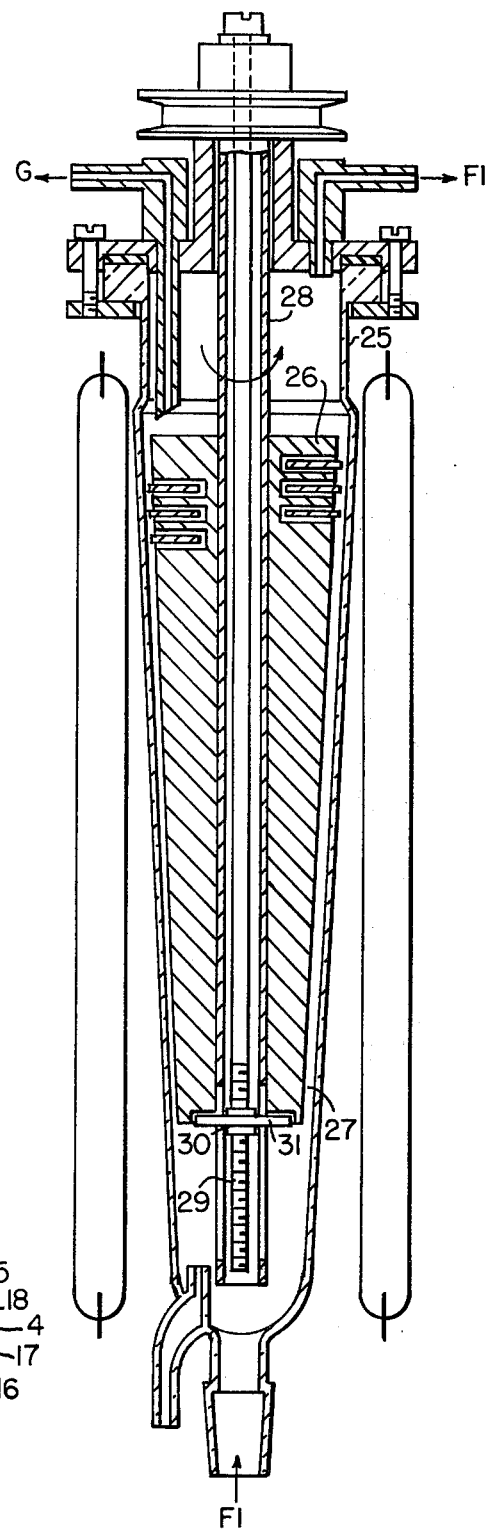

– 1 –

APPARATUS FOR THE IRRADIATION OF FLUIDS

BACKGROUND OF THE INVENTION

1. Field of the Invention:

The invention relates to an apparatus for the irradiation of fluids for causing chemical reactions resulting in the formation of chemical compounds.

2. Description of the Prior Art:

To cause chemical reactions by irradiation, the compounds to be irradiated are conducted in fluid form through an apparatus including a container having walls which are permeable for the particular radiation, the radiation source being arranged at the outside of such apparatus and the radiation therefrom passing through the walls of the apparatus to irradiate the fluid therein.

However, during photochemical reactions for example, frequently compounds are formed which tend to deposit on the interior walls of the apparatus. These deposits may absorb the radiation passing through the container walls to such an extent that the chemical reactions of the fluids in the container are impaired or even fully discontinued. In order to remove such deposits from the container walls rotating brushes have been used whose wiping elements continuously clean the inner surface of the container walls. However, the rotation of such brushes causes also the fluid to rotate except for a layer along the surface of the container which, because of the friction at the container walls, rotates at greatly reduced speed and whose thickness depends on the rotational speed of the fluid. It has now been found that the wiping elements such as the bristles of a brush become more and more ineffective with increased rotational speed because they are bent backwardly as a result of the resistance of the fluid and the resiliency of the bristles which then no longer wipe the surface of the container with the surface pressure necessary for proper cleaning.

SUMMARY OF THE INVENTION

In an apparatus for the irradiation of fluids which apparatus has walls that are permeable for the radiation to be applied to the fluid in the apparatus a rotor is arranged and provided with wiping elements for cleaning the inner surface of the apparatus walls from deposits which would absorb the radiation. The rotor has essentially radial bores and pins movably disposed in the bores, the pins being forced outwardly during rotation of the rotor into contact with the container walls thereby firmly wiping off any deposits therefrom.

The pins, although being able to follow any variation in the contour of the inner surface of the apparatus, provide firm wiping action at any speed since they are relatively stiff and, at increased rotor speeds, are forced only into firmer contact with the walls of the apparatus by increased centrifugal forces which cause the pins to cut easily through the surface layer of the fluid along the walls of the apparatus.

The invention will become more readily apparent from the following description of preferred embodiments thereof shown, by way of example only, in the accompanying drawings, in which:

FIG. 1 is a cross-sectional view of the apparatus including a cylindrical container and the rotor therein shown cut along their axes;

FIG. 2 is a cross-sectional view along line II—II of FIG. 1;

FIG. 3 is a cross-sectional view of another embodiment in which the container and rotor are somewhat conical in shape.

DESCRIPTION OF THE PREFERRED EMBODIMENT

Figure 4:
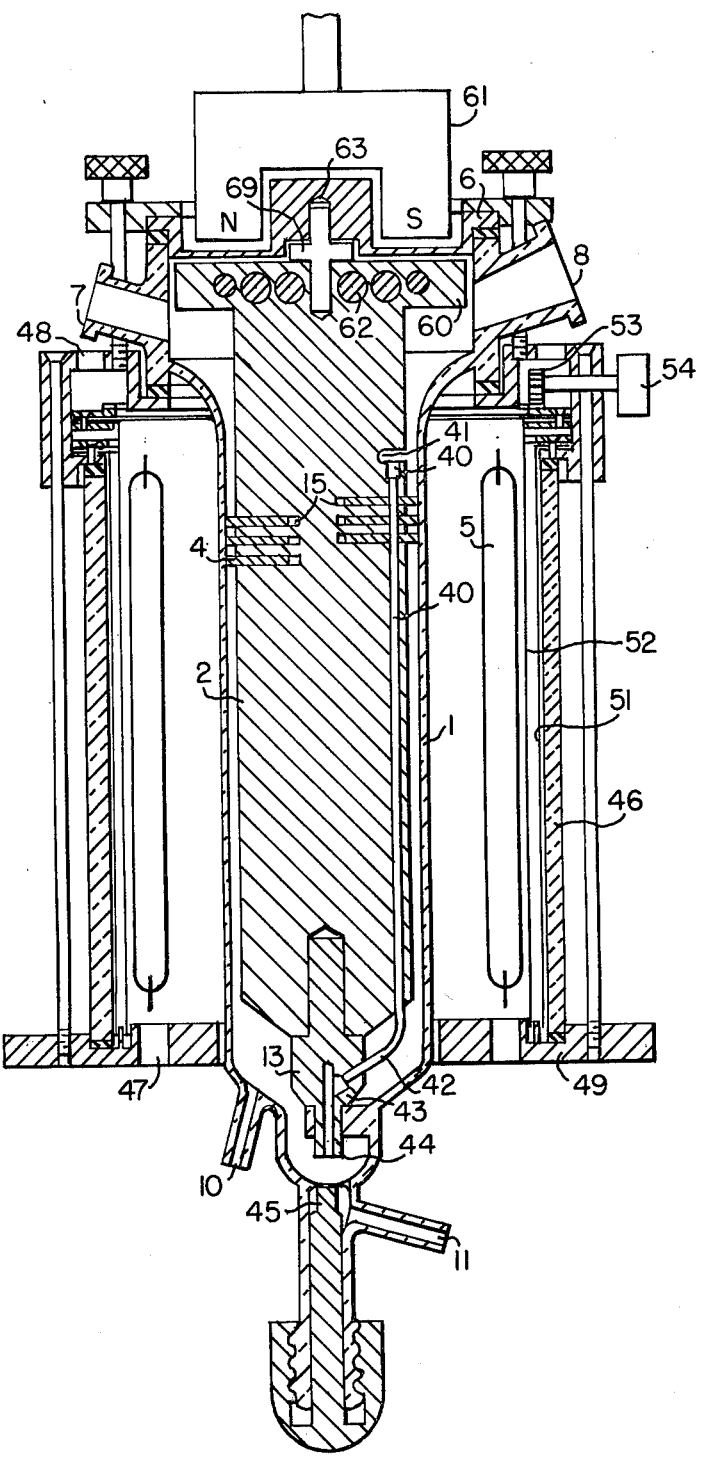
FIG. 4 is a view similar to FIG. 1, of an embodiment including means which facilitate the testing of the apparatus.

The apparatus as shown in FIG. 1 comprises a cylindrical container 1 consisting of glass or quartz, a full-bodied rotor 2 consisting of a plastic which is resistant to the fluid to be treated in the apparatus as well as to the radiation to which the fluid is to be exposed. The rotor 2 carries relatively stiff cylindrical pins 4 which also consist of plastic and serve as wiping elements. Radiation sources 5, such as UV irradiation lamps, are disposed around the container 1.

The container 1 is closed at its upper end by a lid 6 which is provided with an inlet 7 for the introduction of a liquid and a discharge tube 8 for the removal of gases from the container 1. The lid 6 is further provided with a neck portion 3 having a central passage through which a drive shaft 9 extends. At its lower end the container 1 is provided with an inlet tube 10 for the introduction of a gas and with a central discharge nozzle 11 for the removal of liquid from the container 1.

The drive shaft 9 which may be hollow extends through a bore formed along the axis 12 of the rotor 2 and is closed at its lower end by a cap nut 13. Shaft 9 and rotor 2 are coupled by a drive pin 14 which extend through the shaft and is received in a corresponding slot formed in the rotor 2. At its upper end the shaft carries drive means such as a sheave coupled with a drive motor.

The rotor 2 has a plurality of radial bores 15 in which the pins 4 are disposed. The pins 4 are so sized that they are axially movable within the bores with some play provided between their fully inserted positions and their fully extended positions in which they contact the container wall and in which position they should still be within the bores 15 with most of their length. The bores 15 and the pins 4 are evenly distributed over the surface of the rotor and preferably so arranged that their axes are disposed along a helix extending around the axis 12 of the rotor 2.

Whenever the shaft 9 and, together therewith, the rotor 2 are rotated, the pins 4 are moved outwardly by the centrifugal force acting on them until their front ends 17 engage the surface of the container 1. The amount of pins used and their distribution can be so selected that every point of the inner surface of the container is wiped by at least one pin. If a liquid is introduced into the container 1 through the inlet 7 the liquid enters first the annular space 18 between the container 1 and the rotor 2 and forms on the inner surface of the container 1 a rotating layer 19 which moves slowly in axial direction toward the discharge nozzle 11. Through the inlet tube 10 a gas, such as air or oxygen may be introduced into the container which passes through the container in counter current with respect to the liquid and is removed through the discharge tube 8 together with any reaction gases formed in the apparatus.

The radiation produced by the radiation sources 5 passes through the container walls. As the radiation source a lamp may be utilized which produces light of a wavelength of 620 nm to 185 nm which has with respect to the liquid in the container a predetermined penetration as required for causing the desired chemical reaction. The thickness of the layer 19 and the depth of penetration of the radiation should be in agreement in order to obtain a good irradiation effectiveness. The thickness of the layer can be influenced by the helical arrangement of the pins that is, particularly, it can be increased. It is also possible to increase the thickness of the layer 19 by providing at the lower end of the container 1 a constriction 20 which reduces the cross-section of the container 1. The increased thickness of the layer 19 so obtained during operation of the apparatus will not hinder the cleaning action of the pins since the surface pressure of the pins on the container walls is not influenced by layer thickness and the increased accumulation of the liquid in front of the pins.

This property as well as the fact that the pins follow automatically the container walls permits the provision of an annular space 19 of variable cross-section, that is the provision of a variable gap between the rotor and the container walls. For this purpose, the embodiment of FIG. 3 has a container 25 and a rotor 26 of conical shape and the rotor 2 is axially movable relative to the container 25. Movement of the rotor 26 relative to container 25 and adjustment of the gap 27 is possible by adjustment of an adjusting screw 29 which extends through the hollow shaft 28 and is engaged by a nut 30. The nut 30 is mounted on the rotor 26 by a drive pin 31 which is received in slots formed in the rotor 26. In the arrangement of FIG. 3 the liquid to be analyzed as well as the gas may be introduced into the apparatus at its lower end and removed from the apparatus through the lid. Then the gap 27 may be completely filled with liquid or a gas-liquid mixture. In every other respect and in principle the arrangement according to FIG. 3 corresponds to that of FIG. 1.

In one embodiment of the invention as shown in FIG. 4 in which functionally identical parts are identified by the same numerals as used in the other figures, the rotor 2 is magnetically coupled with the rotor drive. For this purpose the lid has a central pocket bore 63 which receives a trunnion 69. The trunnion 69 which may consist of glass is fitted into a flange-like extension 60 of the rotor 2. The flange-like extension 60 carries several bar magnets 62 which are magnetically coupled with a rotating magnetic structure 61 of U-shaped cross-section that receives the flange-like extension 60 therebetween to be drawn by the rotating magnetic structure 61. The rotor 2 has a number (at least one) of axial passages 40 extending therethrough which passages terminate, at the upper end of the rotor, in radial bores 41 providing exit nozzles or in an annular groove. The inlet for the passages 40 is arranged in the center of the container 1 at the lower end of the rotor 2 and is connected for example by conduits 42 to the passages 40. The conduits 42 are supported in grooves 43 formed in the cap nut 13 and are joined in a common inlet nozzle 44.

During normal operation of the apparatus fluid is introduced into the container through the inlet 7 by a metering pump which is not shown in the drawings. The fluid leaves the container through discharge nozzle 11. At the same time, a gas, such as air or oxygen, is introduced into the container through the inlet tube 10 which gas is discharged through the discharge tube 8 together with any reaction gases generated during the irradiation of the fluid. The reaction gases are conducted to an analyzer (not shown) for their analyzation. In order to test proper operation of the apparatus a certain amount of a reference liquid is introduced into the container 1 through the inlet 7 the reference liquid having a known content of impurities, especially, a known amount of hydrocarbon. At the same time, a valve 45, which is mounted on the discharge nozzle 11, is closed so that any liquid introduced into the container is collected in the lower plenum and finally, enters the inlet nozzle 44 from where it is returned through passages 42, 40 and 41 to the upper end of the container 1 to be immediately irradiated upon repeated down-flowing along the container walls. After a predetermined time the test fluid is examined and the changes are noted. Such immediate recirculation of a small amount of reference fluid reduces the time required for testing the apparatus to only a few minutes.

The radiation sources 5 are disposed within a glass envelope 46 which is supported by upper and lower flanges 49 and 50 which are provided with vents 47, 48. The flanges 49 and 50 also support shutters 51, 52 which, together, surround the radiation sources and which also serve as reflectors for the radiation emitted from the radiation source. However, in order to facilitate visual inspection of the apparatus, only one of the shutters is firmly mounted on the flanges while the other is pivotal around the axis of the apparatus and movable relative to the other shutter. The movable shutter has a ring gear mounted at its upper end and a pinion 53 is rotatably supported in engagement with the ring gear and may be rotated by hand by a control button 54 connected to the pinion for pivoting the movable shutter relative to the fixed shutter to open a gap between the two shutters for inspection of the apparatus or to close such gap to prevent escape of radiation.

The apparatus according to the present invention is well suited for continuous operation in which the fluid to be irradiated is admitted to the container by a metering pump and is removed after passage through the container. Also, the reaction gases formed in the container are continuously removed and analyzed. Any deposits formed on the container walls are firmly wiped off so that the irradiation intensity remains essentially constant over long periods of time.

The effectiveness of the apparatus, however, can always be tested, if, by a second metering pump, a test fluid is admitted to the container wherein the test fluid has known properties the test fluid being analyzed after passage through the apparatus and the results compared with the known properties of the test fluid as entered into the apparatus. The effectiveness of the apparatus can be tested in a simpler manner if it is equipped as shown in, and described with regard to, FIG. 4. It is then sufficient simply to collect a certain amount of test fluid in the container and, as the level of such amount is above the inlet opening of nozzle 44 the test fluid is sucked into the passages 42, 40 and evenly distributed on the container walls as it leaves the radial bores 41 upon rotation of the rotor 2. After circulation of the relatively small amount of test fluid through the apparatus, which takes only a few minutes, such amount can be analyzed and the results compared with the reference values.

What is claimed is:

1. Apparatus for the irradiation of fluids to initiate chemical reactions resulting in the formation of chemical compounds, said apparatus comprising: an axially symmetrical container consisting of a material which is permeable for the radiation to which the fluid is to be exposed; at least one radiation source so arranged relative to said container as to irradiate said container; means for conducting said fluid through said container to subject it to the radiation from said radiation source; a rotor centrally supported in said container for rotation therein; and means for rotating said rotor, said rotor consisting of a body having a plurlity of bores formed therein in an essentially radial orientation and pins slidably received in said bores and adapted, upon rotation of said rotor, to abut the inner surface of said container thereby to wipe any deposits therefrom.

2. Apparatus as recited in claim 1, wherein said bores and pins are so distributed over said rotor that their axes are disposed in a helix extending around the rotor axis.

3. Apparatus as recited in claim 1, wherein the interior of said container and said rotor are of conical shape and said rotor is axially movably mounted in said container, with a gap being provided between said rotor and said container which gap is adjustable by axial movement of said rotor relative to said container.

4. Apparatus as recited in claim 1, wherein a plenum is provided in said container at each axial end of said rotor and said container is provided with a constriction of at least one of said plenums.

5. Apparatus as recited in claim 1, wherein said rotor has at least one passage extending axially therethrough and having a lower entrance opening in the center of the rotor and an upper exit opening at the periphery of the rotor thereby to cause fluid to be returned from the entrance area of said passage to the upper end of the rotor upon its rotation.

6. Apparatus as claimed in claim 1, wherein said rotor has axial bores extending therethrough, said axial bores having exit openings at the upper periphery of the rotor and flexible conduits connected to the lower entrance ends of said bores, said flexible conduits being centrally joined and supported in a support member disposed at the lower end of the rotor, said flexible conduits being joined in a common inlet nozzle having an opening arranged in the center of said container.

7. Apparatus as recited in claim 1, wherein the radiation sources are arranged around said container and an envelope of glass surrounds said radiation sources, and wherein radiation reflective shutters are mounted around said radiation sources to contain the radiation within said shutters, said shutters being movable around the center of said container and relative to each other to permit observation of the apparatus during operation thereof.

* * * * *